United States Patent
Burgyan et al.

(10) Patent No.: US 7,116,086 B2
(45) Date of Patent: Oct. 3, 2006

(54) SYSTEM AND METHOD FOR DRIVING LEDS

(75) Inventors: Lajos Burgyan, Mountain View, CA (US); Francois Prinz, San Jose, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/729,729

(22) Filed: Dec. 5, 2003

(65) Prior Publication Data

US 2004/0080301 A1 Apr. 29, 2004

Related U.S. Application Data

(63) Continuation of application No. 10/229,602, filed on Aug. 27, 2002, now Pat. No. 6,690,146.

(60) Provisional application No. 60/390,734, filed on Jun. 20, 2002.

(51) Int. Cl.
*G04F 1/40* (2006.01)
*G04F 1/44* (2006.01)

(52) U.S. Cl. .................. 323/271; 323/274; 323/303

(58) Field of Classification Search ............. 323/271, 323/274, 303, 275, 272
See application file for complete search history.

(56) References Cited

U.S. PATENT DOCUMENTS

| | | | | |
|---|---|---|---|---|
| 5,661,645 A * | 8/1997 | Hochstein | ............ | 363/89 |
| 6,498,440 B1 * | 12/2002 | Stam et al. | ............ | 315/291 |
| 6,522,558 B1 * | 2/2003 | Henry | ............ | 363/60 |
| 6,556,067 B1 * | 4/2003 | Henry | ............ | 327/536 |
| 6,621,235 B1 * | 9/2003 | Chang | ............ | 315/216 |
| 6,636,104 B1 * | 10/2003 | Henry | ............ | 327/536 |
| 6,836,157 B1 * | 12/2004 | Rader et al. | ............ | 327/66 |

FOREIGN PATENT DOCUMENTS

| | | |
|---|---|---|
| DE | 198 41 490 | 3/2000 |
| DE | 100 13 215 | 9/2001 |
| DE | 100 13 216 | 9/2001 |
| EP | 1 113 708 | 7/2001 |
| EP | 1 161 121 | 12/2001 |
| EP | 1 322 139 | 6/2003 |

OTHER PUBLICATIONS

PCT Search Report for International Application No. PCT/US03/26651.

* cited by examiner

*Primary Examiner*—Bao Q. Vu
(74) *Attorney, Agent, or Firm*—Sidley Austin LLP

(57) ABSTRACT

Embodiments of the invention provide for a system and method for driving LEDs with consistently good illumination and superior efficiency at lower cost and suitable for use with cheaper LEDs or with LEDs having wide component parameter tolerances over wide operating voltages and temperature variations.

41 Claims, 3 Drawing Sheets

SYSTEM AND METHOD FOR DRIVING LEDS

RELATED APPLICATIONS

The present application is a continuation of U.S. patent application Ser. No. 10/229,602, filed on Aug. 27, 2002 now U.S. Pat. No. 6,690,146, entitled "High Efficiency LED Driver." which claims priority from U.S. Provisional Patent Application Ser. No. 60/390,734, filed on Jun. 20, 2002, entitled "High Efficiency LED Driver", both of which are assigned to the present assignee and hereby incorporated by reference in their entireties.

FIELD OF THE INVENTION

This invention generally relates to driver circuitry. The invention more specifically relates to a system and method for driving light emitting diodes (LEDs).

BACKGROUND OF THE INVENTION

LEDs, and driver circuits to energize them, are well known. The brightness of an LED is directly related to the current applied. The voltage developed across an LED depends primarily upon the semiconductor design and technology used and upon manufacturing tolerances. Where multiple LEDs are used in close proximity, it is often desirable that they operate at fairly matched light output levels. Various circuits and approaches have been previously developed for achieving uniform illumination of LEDs. But these previously developed techniques have suffered from one or more disadvantages. For example, these techniques may have driver circuits operating very inefficiently. Also, the techniques may require LEDs manufactured to a close tolerance or with matched parameters established by testing. This drives up cost.

Energy efficiency is particularly important in portable devices energized by primary cells, such as the familiar alkaline "battery".

BRIEF DESCRIPTION OF THE DRAWINGS

For a more complete understanding of the present invention and for further features and advantages, reference is now made to the following description taken in conjunction with accompanying drawings, in which.

For convenience in description, identical components have been given the same reference numbers in the various drawings.

DETAILED DESCRIPTION OF THE PREFERRED EMBODIMENTS

Figure 1:
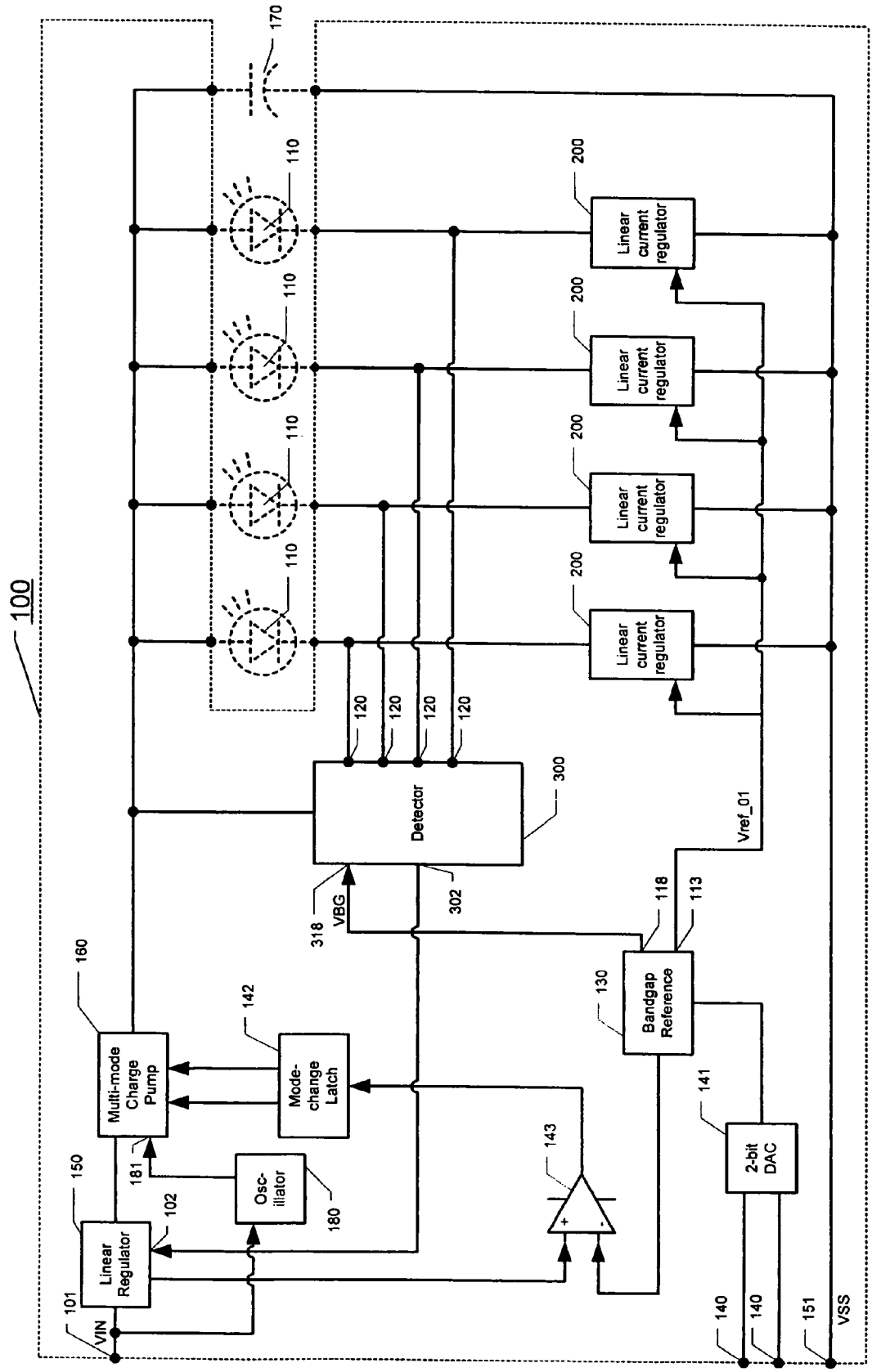
FIG. 1 is a circuit diagram in partial block form of an LED driver circuit according to an embodiment of the invention.

In the following description, for purposes of clarity and conciseness of the description, not all of the numerous components shown in the schematic are described. The numerous components are shown in the drawings to provide a person of ordinary skill in the art a thorough, enabling disclosure of the present invention. The operation of many of the components would be understood and apparent to one skilled in the art.

In various embodiments of the invention, circuits and methods are provided for driving LEDs with consistently good illumination and superior efficiency at lower cost and suitable for use with cheaper LEDs or with LEDs having wide component parameter tolerances over wide operating voltages and temperature variations. The circuits disclosed may be, but need not be, embodied on a single semiconductor chip.

According to an aspect of the invention, a circuit is used for providing current to a plurality of LEDs which may be, but need not be, of the higher operating voltage type sometimes known as "white LEDs" for their broad optical spectrum output. The circuit may comprise a plurality of active current regulators, each controlling current in a single LED, a charge pump supplying current to the plurality of LEDs, a voltage regulator supplying energy to the charge pump and a detector adapted to detect current starvation at any or all of the current limiters. According to a further aspect of the invention, the voltage regulator may have an output that is responsive to detection of current starvation.

According to a still further aspect of the invention, the charge pump may have multiple operating modes, each with distinctive voltage gains. The modes may be selected according to detection of current starvation in order to provide for operation at good efficiency.

According to a further aspect of the invention, a method is provided for illuminating LEDs with relatively uniform brightness and superior overall energy efficiency as compared with previously developed methods.

Other aspects of the invention are possible, and some of them are described below.

FIG. 1 is a circuit diagram in partial block form of an exemplary LED driver circuit 100 according to a particular embodiment of the invention. LED driver circuit 100 may drive multiple LEDs 110 and, in some embodiments, may be implemented on a single integrated circuit or chip. LEDs 110 (shown in dashed outline) may be, but need not be, implemented separately from the chip for mechanical or other reasons. A smoothing capacitor 170, which may be implemented on chip or off chip, generally functions to dampen ripple.

As depicted, the LED driver circuit 100 receives a power supply input voltage VIN at an input voltage terminal 101. A linear regulator 150 is connected to input voltage terminal 101 and has a control terminal 102. Control terminal 102 receives a control input from feedback signal terminal 302 of detector 300. Linear regulator 150 may be implemented, for example, as a single MOS (metal-oxide semiconductor) transistor. Such an embodiment for the linear regulator 150 is relatively energy efficient as is desired to achieve good efficiency for the circuit 100 as a whole.

The control input to linear regulator 150 at control terminal 102 can be generated by a detector 300. The output from linear regulator 150 may be applied to a multi-mode charge pump 160. Multi-mode charge pump 160 also receives a clock signal, which can be a high frequency square wave, at input port 181. The clock signal may be generated by an oscillator 180 which may be energized from voltage VIN at terminal 101. Charge pumps to increase DC (direct current) voltages, such as by capacitor switching, are well-known in the art. Also well-known in the art are multi-mode charge pumps which can operate in any of two or more modes having distinct voltage gains according to the mode selected and voltage gain desired. In one embodiment, multi-mode charge pump 160 is capable of operating in any one of three distinct modes according to binary control signals received from a mode-change latch 142. In an embodiment of the invention, the multi-mode charge pump can operate at voltage gain ratios of 2:1 or 3:2 or as a simple passthrough at 1:1 nominal voltage gain. In practical operation, it is possible that switches in multi-mode charge pump 160 will cause some voltage drops relative to the nominal or theoretical voltage gains. Multi-mode charge pump 160 provides voltage to LEDs 110.

In one embodiment, mode-change latch 142 has a two-bit, unclocked digital output and is responsive to an analog voltage level input. A mode control OpAmp (Operational Amplifier) comparator 143 may generate the analog signal to control the mode change latch 142.

In one embodiment, each LED 110 has an associated current regulator 200. The current passed by regulators 200 is set by reference voltage Vref_01 generated by a bandgap reference circuit 130. Bandgap reference circuits are well known in the art. In the event that the LED supply (e.g., charge pump 160) is sourcing insufficient current to an LED 110, then current starvation in the associated current regulator 200 will occur. This condition may be sensed by detector 300 as under-voltage at one or more of the input ports 120 of the detector 300. When a condition of under-voltage is detected by detector 300, detector 300 acts to control linear regulator 150 so as to increase voltage supplied to charge pump 160. This increases voltage supplied to all of the LEDs 110, thus abating the current starvation and associated under-voltage. Thus, through closed loop control, the voltage supplied to LEDs 110 is maintained at the minimum necessary to avoid current starvation. Since only the minimum voltage is maintained, current starvation will be incipient in the normal operating condition. Although some LEDs 110 may be supplied with more voltage than needed, uniform illumination is maintained because each LED 110 has its own respective current regulator 200.

The supply voltage may be insufficient for current starvation to be abated by action of the linear regulator 150 alone, as may occur for example if the power supply is a primary cell approaching the end of its useful life. In that event, control OpAmp comparator 143 detects that the linear regulator 150 is railed and signals mode change latch 142 to change the multi-mode charge pump 160 to operate in the next higher mode. This next higher mode has a higher voltage gain, and thus restores LED 110 current to a non-starving condition. Detector 300 enables linear regulator 150 to throttle back voltage supply to multi-mode charge pump 160 to the minimum necessary to restore circuit equilibrium. Thus, charge pump 160 is operated with higher gain only when necessary and hence the circuit operates with best efficiency under the prevailing supply voltage availability. Taken as a whole, the circuit design helps get maximum useful life from a primary cell power source such as may be used to energize typical portable electronic devices. In an exemplary embodiment, mode change latch 142 can act in a complementary manner to cause multi-mode charge pump 160 to operate in a more economical mode with less voltage gain if and when input voltage VIN is restored to a suitably high level.

In an exemplary embodiment, bandgap reference circuit 130 generates fixed voltage references for OpAmp comparator 143 and also a bandgap voltage VBG at reference terminal 118 applied to detector 300 at terminal 318. Bandgap reference circuit 130 may provide a bandgap voltage of approximately 1.268 volts. In the same embodiment, bandgap reference circuit 130 generates a reference voltage Vref_01 at terminal 113 to control current regulators 200. The magnitude of voltage Vref_01 may be controlled by a 2-bit binary input 140 to DAC (digital to analog converter) 141. The 2-bit binary input control functions to provide a choice of three different LED currents, and hence three different LED brightnesses, plus a dark (or off) setting of no (or negligible) LED current. The choice of brightness might be hard wired or user selectable according to product application. When the circuit 100 is in an "off" condition with the LEDs extinguished, linear regulator 150 throttles back. Nonetheless, a small current may still pass through linear regulator 150. This may serve to pre-charge capacitor 170, thus avoiding a possibly excessive startup transient.

Figure 2:
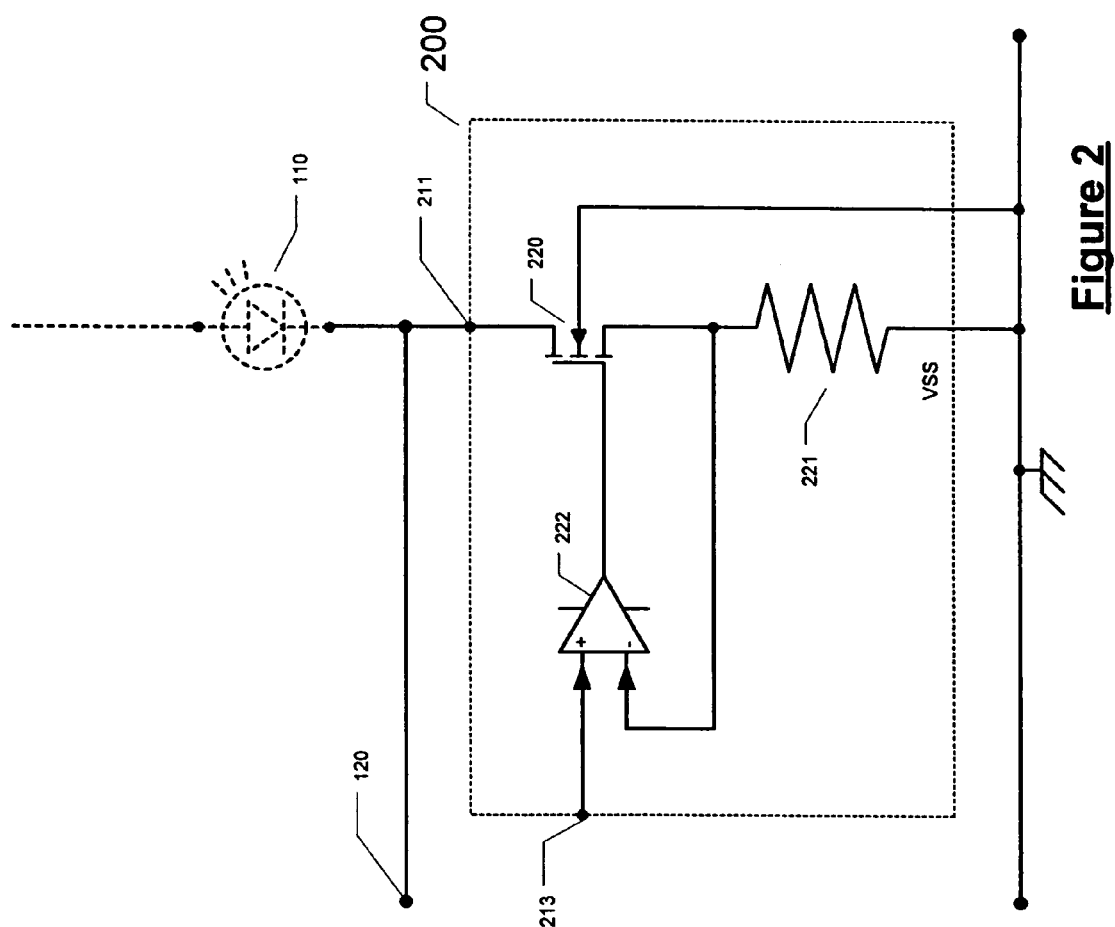
FIG. 2 is a schematic diagram of a current regulator according to an embodiment of the invention.

FIG. 2 is a schematic diagram of a current regulator 200 according to an embodiment of the invention. The current regulator 200 may be connected to an LED 110. The current regulator 200 sinks current at the input terminal 211 and tends to operate as a constant current load. As such current regulator 200 is suitable for controlling current through LED 110 which may be connected to input terminal 211. Op Amp 222 operates as a voltage follower with a reference voltage provided at reference terminal 213 to control FET 220 to maintain a fixed voltage across resistor 221, and hence maintain a fixed current through resistor 221. The same fixed current flows through external LED 110. A low voltage device may be used for FET 220 so that the current regulator drops only about 700 mV for good overall circuit efficiency. In the event that the LED supply is providing insufficient current then current starvation in current regulator 200 will occur and this may be sensed externally at terminal 120 as under-voltage at input terminal 211.

Figure 3:
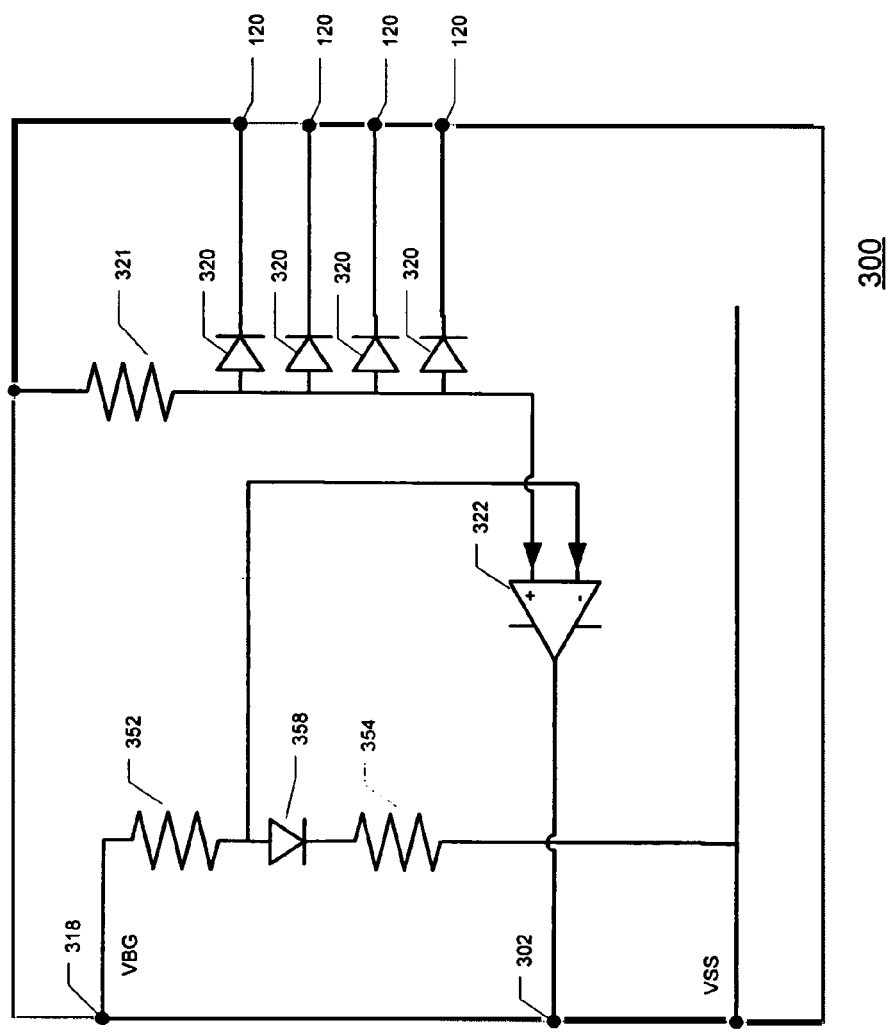
FIG. 3 a schematic diagram of an under-voltage detector according to an embodiment of the invention.

FIG. 3 a schematic diagram of an under-voltage detector 300 according to an embodiment of the invention. Detector 300 receives bandgap reference voltage VBG at terminal 318. Bipolar diodes 320 operate as a wired-OR with pull-up resistor 321 to provide to OpAmp 322 a voltage at a fixed offset from the lowest of the voltages presented at the sense terminals 120. Bipolar diodes having a low threshold voltage may be used in an embodiment for wired-OR diodes 320. Resistors 352 and 354 act together with diode 358 to provide a reference voltage for OpAmp 322 that is compensated for temperature variance in the circuit. Diodes 120 and 358 may typically be implemented in the same technology, such as bipolar, and/or on a common substrate for good temperature tracking. Op Amp 322 generates a feedback level signal at terminal 302, which is used in a closed loop control to ensure that the lowest of the voltages sensed at terminal 120 is held at the correct and near optimal value.

In an embodiment described above, when the circuit is operating normally, the current through each of the four LEDs 110 will be equal, but the voltages across them will upon individual device characteristics. Under this condition, one of the four LEDs will develop the highest voltage and correspondingly, the respective current regulator 200 will develop the minimum voltage required to sustain the desired current. This minimum voltage will be the voltage sensed by the detector 300. The other LEDs 110 will develop lower voltages and their respective current regulators 200 will develop correspondingly higher voltages.

Embodiments of the invention as described herein have significant advantages over previously developed implementations. For example, an embodiment disclosed above provides, as compared with previously developed solutions, a superior tradeoff between cost, uniformity and controllability of illumination intensities, energy efficiency, tolerance of wide LED operating voltages, wide power supply variations and wide component tolerances and support for multiple LEDs.

As will be apparent to one of ordinary skill in the art, other similar circuit arrangements are possible within the general scope of the invention. For example, the invention need not be limited to processes providing field-effect transistors and bipolar diodes, various other types of active and non-linear devices such as JFETs (unction FETs) may be employed within the general scope of the invention. As another example, the various channels may be intentionally arranged to carry independently differing currents at the same bias voltages, such independently differing currents may be fixed or adjustable also. Even embodiments with discrete components may be within the general scope of the invention. The embodiments described above are intended to be exemplary rather than limiting and the bounds of the invention should be determined from the claims.

What is claimed is:

1. A system for driving a plurality of light emitting diodes (LEDs) comprising:
    a voltage regulator operable to provide current to the plurality of LEDs;
    a plurality of current regulators, each current regulator connected to a respective LED and operable to regulate the current provided to the respective LED; and
    a detector coupled to the plurality of current regulators, the detector operable to detect an occurrence of current starvation at any of the current regulators, the detector further operable to output a signal for adjusting power supplied to the charge pump in response to the detection of an occurrence of current starvation.

2. The system of claim 1 wherein the charge pump has at least two operating modes, each operating mode having a respective voltage gain, and wherein one of the at least two operating modes is selected in response to the detection of an occurrence of current starvation.

3. The system of claim 2 further comprising a mode latch operable to control selection of an active operating mode from the at least two operating modes.

4. The system of claim 1 wherein the detector receives a reference voltage and comprises a comparator operable to compare the reference voltage to a voltage derived from one or more of the LEDs.

5. The system of claim 1 wherein the detector comprises a wired-OR circuit arrangement.

6. The system of claim 1 wherein the detector comprises a temperature compensating diode.

7. The system of claim 1 wherein the detector comprises a plurality of bipolar diodes, each bipolar diode connected to a respective one of the LEDs.

8. The system of claim 1 wherein each current regulator comprises a respective field effect transistor.

9. The system of claim 1 wherein the system is implemented entirely on a single, semiconductor die.

10. The system of claim 1 wherein the voltage regulator comprises a charge pump.

11. A method for driving a plurality of light emitting diodes (LEDs) comprising:
    providing current to the plurality of LEDs using a voltage regulator;
    regulating the current provided to each LED with a respective current regulator;
    detecting an occurrence of current starvation at any of the current regulators; and
    adjusting power supplied to the charge pump in response to the detection of an occurrence of current starvation.

12. The method of claim 11 wherein the voltage regulator has at least two operating modes, each operating mode having a respective voltage gain, wherein the method comprises selecting one of the at least two operating modes in response to the detection of an occurrence of current starvation.

13. The method of claim 12 comprising controlling the selection of an active operating mode from the at least two operating modes.

14. A circuit for providing current to a plurality of light emitting diodes (LEDs), the circuit comprising:
    a charge pump terminal operable to supply current to the plurality of LEDs;
    a voltage regulator operable to supply energy to the charge pump;
    a plurality of current regulators, each current regulator operable to control current in a respective one of the LEDs; and
    a detector operable to detect a condition of current starvation at any of the current regulators;
    wherein the voltage regulator has an output that is responsive to detection of the condition of current starvation.

15. The circuit of claim 14 wherein the charge pump has at least two operating modes, each operating mode having a respective voltage gain, and wherein one of the at least two operating modes is selected in response to detection of the condition of current starvation.

16. The circuit of claim 15 further comprising a mode latch operable to control selection of an active operating mode from the at least two operating modes.

17. The circuit of claim 14 wherein the detector comprises a wired-OR circuit arrangement.

18. The circuit of claim 14 wherein the detector comprises a plurality of bipolar diodes and each current regulator comprises a respective field effect transistor.

19. A system for driving a plurality of light emitting diodes (LEDs) comprising:
    a charge pump operable to provide current to the plurality of LEDs;
    a detector coupled to the plurality of LEDs, the detector operable to detect an undervoltage condition at any of the LEDs, the detector further operable to output a signal for adjusting power supplied to the charge pump in response to the detection of the undervoltage condition; and
    a plurality of current regulators, each current regulator connected to a respective LED and operable to regulate the current provided to the respective LED so that, collectively, the plurality of LEDs are uniformly illuminated.

20. The system of claim 19 wherein the charge pump comprises a multi-mode charge pump operable to function in a plurality of operating modes, each mode operating mode having a respective voltage gain.

21. The system of claim 20 further comprising a mode latch operable to store information for selecting one of the plurality of operating modes.

22. The system of claim 19 wherein the detector receives a reference voltage and comprises a comparator operable to compare the reference voltage to a voltage derived from one or more of the LEDs.

23. The system of claim 19 wherein the detector comprises a wired-OR circuit arrangement.

24. The system of claim 19 wherein the detector comprises a plurality of bipolar diodes, each bipolar diode connected to a respective one of the LEDs.

25. The system of claim 19 wherein the system is implemented entirely on a single, semiconductor die.

26. A method for driving a plurality of light emitting diodes (LEDs) comprising:
providing current to the plurality of LEDs using a charge pump;
regulating the current provided to each LED so that, collectively, the plurality of LEDs are uniformly illuminated;
detecting an undervoltage condition at any of the LEDs; and
adjusting power supplied to the charge pump in response to the detection of the undervoltage condition.

27. The method of claim 26 wherein the charge pump has at least two operating modes, each operating mode having a respective voltage gain.

28. The method of claim 27 wherein adjusting comprises selecting one of the at least two operating modes in response to the detection of an undervoltage condition.

29. A system for providing power to a plurality of light emitting diodes (LEDs) comprising:
a multi-mode charge pump operable to provide voltage to the LEDs at a plurality of gain ratios;
a detector for detecting if a supply voltage for the system is diminishing and for adjusting the gain ratio of the multi-mode charge pump in response to the detection of a diminishing supply voltage; and
a plurality of current regulators, each current regulator coupled to one of the plurality of LEDs for individually adjusting the power supplied to the respective LED.

30. The system of claim 29 wherein the detector comprises a comparator for comparing the supply voltage against a reference voltage.

31. A method for providing current to a plurality of light emitting diodes (LEDs) comprising:
regulating current in each of the LEDs to not exceed a desired amount;
detecting a condition of current starvation in any of the LEDs; and
regulating a voltage supplied to the plurality of LEDs in response to the detecting so that the current starvation is abated.

32. The method of claim 31 wherein the regulating a voltage is performed using a multi-mode charge pump.

33. The method of claim 31 wherein the regulating a voltage is performed using a linear voltage regulator.

34. A system for providing current to a plurality of light emitting diodes (LEDs) comprising:
means for regulating current in each of the LEDs to not exceed a desired amount;
means for detecting a condition of current starvation in any of the LEDs; and
means for regulating a voltage supplied to the plurality of LEDs in response to the detecting so that the current starvation is abated.

35. The system of claim 34 wherein the means for regulating a voltage comprises a multi-mode charge pump.

36. The system of claim 34 wherein the means for regulating a voltage comprises a linear voltage regulator.

37. A detector for regulating power provided to a plurality of light emitting diodes (LEDs) comprising:
a plurality of diodes, each diode connected to a respective LED at a respective sense terminal, wherein the plurality of diodes operate collectively to provide a signal derived from a lowest of voltage values appearing at the sense terminals; and
an operational amplifier operable to receive the signal provided by the plurality of diodes, the operational amplifier operable to generate a feedback signal for controlling the power supplied to the plurality of LEDs so that the voltage values appearing at the sense terminals are held at an appropriate level.

38. The detector of claim 37 wherein each diode comprises a bipolar diode.

39. The detector of claim 37 wherein operational amplifier compares the signal provided by the plurality of diodes against a reference signal.

40. The detector of claim 37 wherein the plurality of diodes function as an OR gate.

41. A method for efficiently powering a plurality of light emitting diodes (LEDs) comprising:
supplying a voltage for the LEDs, wherein the voltage causes current to flow through each of the LEDs;
regulating the current in each of the LEDs to not exceed a respective predetermined amount so that the LEDs are uniformly illuminated;
detecting if any one of the LEDs is receiving insufficient current; and
in response to the detection of insufficient current, adjusting the voltage supplied to the LEDs so that no LED is receiving insufficient current.

* * * * *

UNITED STATES PATENT AND TRADEMARK OFFICE
CERTIFICATE OF CORRECTION

PATENT NO. : 7,116,086 B2 Page 1 of 1
APPLICATION NO. : 10/729729
DATED : October 3, 2006
INVENTOR(S) : Lajos Burgyan and Francois Prinz It is certified that error appears in the above-identified patent and that said Letters Patent is hereby corrected as shown below:

Column 5, line 9, "unction" should read --junction--

Claim 1, line 31, "to the charge" should read --to a charge--

Claim 11, line 66, "to the charge" should read --to a charge--

Claim 14, line 12, delete "terminal"

Claim 25, line 2, "single, semiconductor" should read --single semiconductor--

Signed and Sealed this

Twenty-sixth Day of June, 2007

JON W. DUDAS
*Director of the United States Patent and Trademark Office*